US008762498B2

(12) United States Patent
Campbell et al.

(10) Patent No.: US 8,762,498 B2
(45) Date of Patent: *Jun. 24, 2014

(54) APPARATUS, SYSTEM, AND METHOD FOR COMMUNICATING TO A NETWORK THROUGH A VIRTUAL DOMAIN

(71) Applicant: Darmate Glassworks LLC, Las Vegas, NV (US)

(72) Inventors: Douglas A. Campbell, Henderson, NV (US); Alan B. Hamor, Pennington, NJ (US); Mike D. Helton, Las Vegas, NV (US)

(73) Assignee: Darmate Glassworks LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/731,731

(22) Filed: Dec. 31, 2012

(65) Prior Publication Data

US 2013/0159464 A1 Jun. 20, 2013

Related U.S. Application Data

(60) Continuation of application No. 11/717,911, filed on Mar. 13, 2007, now Pat. No. 8,370,457, which is a division of application No. 09/542,858, filed on Apr. 4, 2000, now Pat. No. 7,209,959.

(51) Int. Cl.
*G06F 15/16* (2006.01)

(52) U.S. Cl.
USPC ............................ 709/219; 709/203; 709/223

(58) Field of Classification Search
None
See application file for complete search history.

(56) References Cited

U.S. PATENT DOCUMENTS

| 5,636,371 | A | | 6/1997 | Yu |
| 5,708,654 | A | | 1/1998 | Arndt et al. |
| 5,805,820 | A | | 9/1998 | Bellovin et al. |
| 5,926,549 | A | | 7/1999 | Pinkas |
| 5,931,912 | A | | 8/1999 | Wu et al. |
| 5,961,593 | A | | 10/1999 | Gabber et al. |
| 6,003,083 | A | | 12/1999 | Davies et al. |
| 6,014,660 | A | | 1/2000 | Lim et al. |
| 6,014,698 | A | | 1/2000 | Griffiths |
| 6,026,445 | A | | 2/2000 | Kephart et al. |
| 6,052,736 | A | | 4/2000 | Ogle et al. |
| 6,061,743 | A | * | 5/2000 | Thatcher et al. ............. 719/328 |
| 6,091,951 | A | | 7/2000 | Sturniolo et al. |
| 6,092,100 | A | | 7/2000 | Berstis et al. |
| 6,098,111 | A | | 8/2000 | Maegawa et al. |
| 6,119,171 | A | | 9/2000 | Alkhatib |

(Continued)

OTHER PUBLICATIONS

"Darpa Internet Program Protocol Specification," Internet Protocol, Sep. 1981; pp. 1-45.

(Continued)

*Primary Examiner* — Van Nguyen
(74) *Attorney, Agent, or Firm* — Amin, Turocy & Watson, LLP

(57) ABSTRACT

The present invention is an apparatus, system and method for communicating to a network through an ad hoc virtual domain. The present invention contains a deceiver, a controller, and a forwarder through which a client communicates through. The deceiver, controller, and forwarder collectively establish the domain in which the ad hoc virtual namespace will exist. This invention allows clients to interact over a network in a fashion that is anonymous and unique to the session which the client is engaging in.

20 Claims, 4 Drawing Sheets

(56) References Cited

U.S. PATENT DOCUMENTS

| | | |
|---|---|---|
| 6,182,148 B1 | 1/2001 | Tout |
| 6,185,626 B1 | 2/2001 | Chivi et al. |
| 6,189,030 B1 | 2/2001 | Kirsch et al. |
| 6,195,691 B1 | 2/2001 | Brown |
| 6,201,962 B1 | 3/2001 | Sturniolo et al. |
| 6,205,489 B1 | 3/2001 | Kapoor |
| 6,249,801 B1 | 6/2001 | Zisapel et al. |
| 6,256,031 B1 * | 7/2001 | Meijer et al. ............... 715/854 |
| 6,256,664 B1 | 7/2001 | Donoho et al. |
| 6,256,739 B1 | 7/2001 | Skopp et al. |
| 6,262,976 B1 | 7/2001 | McNamara |
| 6,272,540 B1 | 8/2001 | Yadav et al. |
| 6,317,775 B1 | 11/2001 | Coile et al. |
| 6,338,082 B1 | 1/2002 | Schneider |
| 6,353,850 B1 | 3/2002 | Wies et al. |
| 6,370,584 B1 | 4/2002 | Bestavros et al. |
| 6,442,687 B1 | 8/2002 | Savage |
| 6,449,657 B2 | 9/2002 | Stanbach et al. |
| 6,493,765 B1 | 12/2002 | Cunningham et al. |
| 6,496,931 B1 | 12/2002 | Rajchel et al. |
| 6,502,135 B1 | 12/2002 | Munger et al. |
| 6,507,585 B1 | 1/2003 | Dobson |
| 6,510,464 B1 | 1/2003 | Grantges et al. |
| 6,549,516 B1 | 4/2003 | Albert et al. |
| 6,594,254 B1 | 7/2003 | Kelly |
| 6,606,315 B1 | 8/2003 | Albert et al. |
| 6,628,654 B1 | 9/2003 | Albert et al. |
| 6,629,149 B1 | 9/2003 | Fraser et al. |
| 6,633,560 B1 | 10/2003 | Albert et al. |
| 6,674,743 B1 | 1/2004 | Amara et al. |
| 6,704,317 B1 | 3/2004 | Dobson |
| 6,718,359 B2 | 4/2004 | Zisapel et al. |
| 6,751,677 B1 | 6/2004 | Ilnicki et al. |
| 6,779,039 B1 | 8/2004 | Bommareddy et al. |
| 6,785,705 B1 | 8/2004 | Kocherlakota |
| 6,823,454 B1 | 11/2004 | Hind et al. |
| 6,880,089 B1 | 4/2005 | Bommareddy et al. |
| 6,891,887 B1 | 5/2005 | Dobson |
| 6,910,180 B1 | 6/2005 | Cui et al. |
| 6,931,434 B1 | 8/2005 | Donoho et al. |
| 7,209,959 B1 * | 4/2007 | Campbell et al. ............. 709/219 |
| 7,472,200 B1 | 12/2008 | Taylor et al. |
| 7,801,080 B2 | 9/2010 | Kim et al. |
| 8,370,457 B2 * | 2/2013 | Campbell et al. ............. 709/219 |

OTHER PUBLICATIONS

RFC 1034, "Domain Names—Concepts and Facilities,"Network Working Group, P. Mockapetris, ISI, Nov. 1987; pp. 1-37.
RFC 1035, "Domain Names—Implementation and Specification," Network Working Group, P. Mockapetris, ISI, Nov. 1987; pp. 1-38.
International Search Report dated Aug. 28, 2001, for International Application No. PCT/US01/08637, 7 pages.
OA dated Feb. 11, 2004 for U.S. Appl. No. 09/542858, 8 pages.
OA dated Jan. 12, 2005 for U.S. Appl. No. 09/542858, 8 pages.
OA dated Sep. 30, 2005 for U.S. Appl. No. 09/542858, 8 pages.
OA dated May 18, 2006 for U.S. Appl. No. 09/542858, 8 pages.
OA dated Jul. 9, 2010 for U.S. Appl. No. 11/717911, 51 pages.
OA dated Dec. 23, 2010 for U.S. Appl. No. 11/717911, 18 pages.
OA dated Apr. 12, 2012 for U.S. Appl. No. 11/717911, 34 pages.
OA dated Sep. 17, 2012 for U.S. Appl. No. 11/717911, 11 pages.

* cited by examiner

APPARATUS, SYSTEM, AND METHOD FOR COMMUNICATING TO A NETWORK THROUGH A VIRTUAL DOMAIN

RELATED APPLICATIONS

This application is a continuation of U.S. patent application Ser. No. 11/717,911, entitled "NETWORK COMMUNICATION THROUGH A VIRTUAL DOMAIN", filed Mar. 13, 2007 (issued as U.S. Pat. No. 8,370,457 on Feb. 5, 2013), which is a divisional of U.S. patent application Ser. No. 09/542,858, entitled "APPARATUS, SYSTEM, AND METHOD FOR COMMUNICATING TO A NETWORK THROUGH A VIRTUAL DOMAIN PROVIDING ANONYMITY TO A CLIENT COMMUNICATING ON THE NETWORK", filed Apr. 4, 2000 (issued as U.S. Pat. No. 7,209,959 on Apr. 24, 2007), the entireties of which are incorporated herein by reference.

SCOPE OF THE INVENTION

This invention relates generally to networks and network systems, and more specifically to a system and method for enabling anonymous network activity, while establishing virtual namespaces for clients.

BACKGROUND

The proliferation and expansion of computer systems, networks, databases, the Internet, and particularly the World Wide Web (WWW), has resulted in a vast and diverse collection of information and means of communication. The current Internet infrastructure involves millions of computers linked together on a computer network. This network allows all of the computers to communicate with one another. Clients are typically linked to the Internet via Internet Service Providers (ISP's), which in turn connect to larger ISP's. This allows numerous clients to communicate to each other through their various connections.

In general, all the machines on the Internet can be categorized into two types: servers and clients. Typically, machines that provide services (like Web servers, FTP servers, Email servers, etc.) are servers. Servers are loaded with the appropriate software in order to allow them to perform their intended services. Machines that request information from servers are typically called clients. In order to differentiate between machines on the network, each machine is given a unique address called an IP address.

The IP address is a thirty-two bit number that is normally expressed as 4 octets in a dotted decimal number (e.g., 192.168.1.101). Each of the octets can have values between 0 and 255 (2 8 possibilities per octet). When a client connects to the Internet, the client is assigned an IP address through their Internet Service Provider (ISP) for the duration of the connection. Conversely, the IP addresses of servers are relatively static, and do not change very often.

Because it is difficult for clients to remember IP addresses, and because IP addresses need to change, most servers on the Internet possess domain names (e.g., "www.whoknowz.com") to help users reach their intended servers without remembering strings of numbers. Name servers, used in the domain name system (DNS), map the human-readable names into IP addresses to help clients reach their destinations. When a client enters a domain name, the browser (via a resolver) extracts the domain name and passes it to a name server, which will return the correct IP address to the associated site. The Domain Name System is comprised of a distributed database and name servers that access that database.

One of the main problems with the current utilization of IP addresses and domain names on the World Wide Web (WWW) is that the WWW is based largely on the hypertext transport protocol ("HTTP-protocol"). The nature of HTTP protocol allows information, such as a client's e-mail address, web sites that were visited, and information on the client's software and host computer, to be recorded and traced by the server. This opens up the user to a range of privacy threats including unwanted e-mails, solicitations, and "cookies" (data that is stored on the client's machine by a server and subsequently used for identification).

Furthermore, clients that wish to cloak themselves from such intrusions are forced into systems that simply provide alternate account identities for the client; while the client is protected, the alternate account identity becomes the object of the unwanted e-mails, "cookies", etc., instead. The effect of this is similar to the client manually creating a new user account in which to browse the WWW.

One of the solutions available is to route the client through a proxy server in order to substitute IP information being sent by the client. When a client desires to visit a web server, the packets sent from client's computer are routed through a proxy server. At the proxy server, the server executes algorithms to extract information that would identify the client, and replaces the information with predetermined substitutes.

Afterwards, the proxy server routes the packet out to the web server. Once the web server receives the packet, all of the information points back to the proxy server, and not to the client. This in effect "hides" the client from the web server.

However, a drawback to such systems is that, as mentioned before, the client is obtaining protection merely through the use of an alternate identity that is ultimately assigned back to the same client. Furthermore, current systems do not have any added flexibility designed in the system to take advantage of anonymous client group browsing or multiple group association. In order to fully take advantage of ad hoc identity browsing, additional features need to be added in order to create a "community-like" environment among numerous anonymous clients.

SUMMARY OF THE INVENTION

To address the above-discussed deficiencies in existing systems, the present invention involves the use of three algorithms, known collectively as DNS Misdirection and individually as the deceiver, the controller, and the forwarder. The deceiver communicates with clients and with the controller. The deceiver provides name resolution for clients. The routine works the same as a standard name server, except when a query is received from a client, the deceiver allows the controller to supply the information. The controller communicates with the deceiver and the forwarder. The controller determines the address, "time to live" (TTL), and other DNS result fields and returns them to the deceiver. The controller is queried by the forwarder for the site address that the client intended to reach.

One advantage of the invention deals with isolating client activity on the Internet. Another important feature of the invention is that the DNS Misdirection system allows for the creation of virtual namespaces. Through these namespaces, the isolated clients can anonymously browse the Internet while being part of a virtual community. By utilizing virtual namespaces and generated root domain names (e.g., "carlover", "winetaster", "stockpicker"), the community activities would be inaccessible to all but intended clients. Furthermore, since virtual namespaces would create a domain through which clients could identify themselves and communicate through, network administrators could establish ad hoc software applications as well as domain-specific identifiers that could be assigned to a user or groups of users.

BRIEF DESCRIPTION OF THE DRAWINGS

The following drawings illustrate certain embodiments of the present invention.

DETAILED DESCRIPTION

Figure 1:
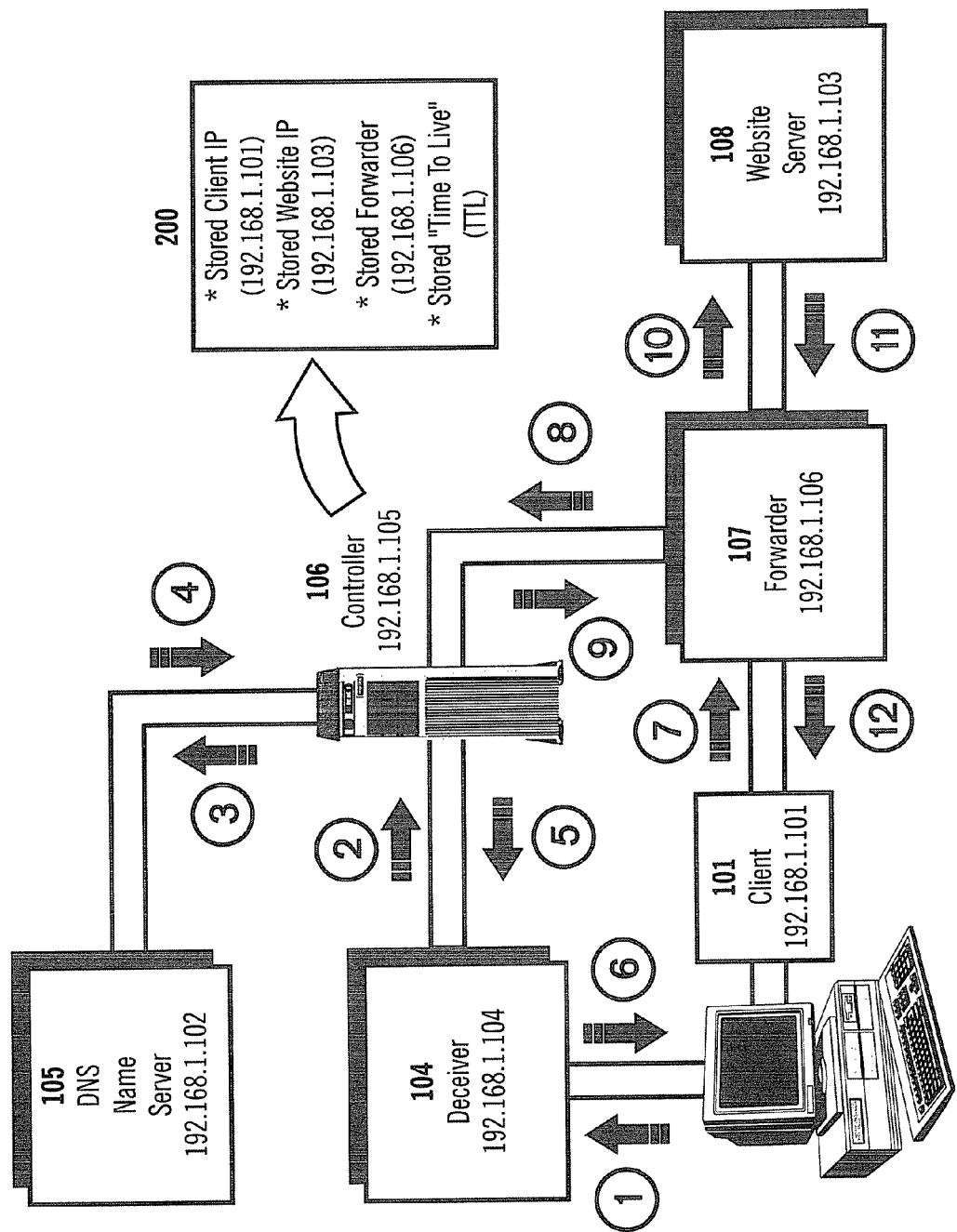
FIG. 1 schematically shows the system architecture of an exemplary network on which one embodiment of the invention may be implemented.

FIG. 1 illustrates an embodiment of the system architecture that contains at least one client (101). This client consists of a personal computer, which contains an interface to a computer network, such as a modem, network interface card, etc. The client (101) may also be generalized as any client application. Loaded in the client computer (101) are an Internet browser and a resolver (not shown). When the client (101) wishes to 20 connect to a site on the Internet, the client (101) will typically enter a destination site domain name into the computer's Internet browser (e.g., "www.whoknowz.com"). In FIG. 1, the destination site is a web server (108). The Internet browser will typically be connected through an ISP (not shown). The domain name can be embedded in a URL (via hyperlink), or can be explicitly entered by the client.

If the client (101) is to reach the web server (108), the client needs to obtain the web server's (108) IP address, shown in FIG. 1 (all of the hypothetically disclosed IP addresses in the invention are shown in the figure). With the architecture used in existing systems, the IP address must be resolved into a 32 bit (IPv4)/128 bit (IPv6) IP address. Normally, the ISP will furnish the clients with a DNS (105), which is accessed through the client's resolver. The resolver is typically predisposed with two IP addresses, which represent the primary and secondary name servers that may be accessed. The name of the server may be entered manually, or may be provided by using Dynamic Host Configuration Protocol (DHCP). The process of resolving domain names, and the operation of DNS servers is addressed further in detail in RFC 1034 ("Domain Names—Concepts and Facilities"—last update: Nov. 17, 1999), and RFC 1035 ("Domain Names—Implementation and Specification"—last update: Nov. 17, 1999).

Figure 2:
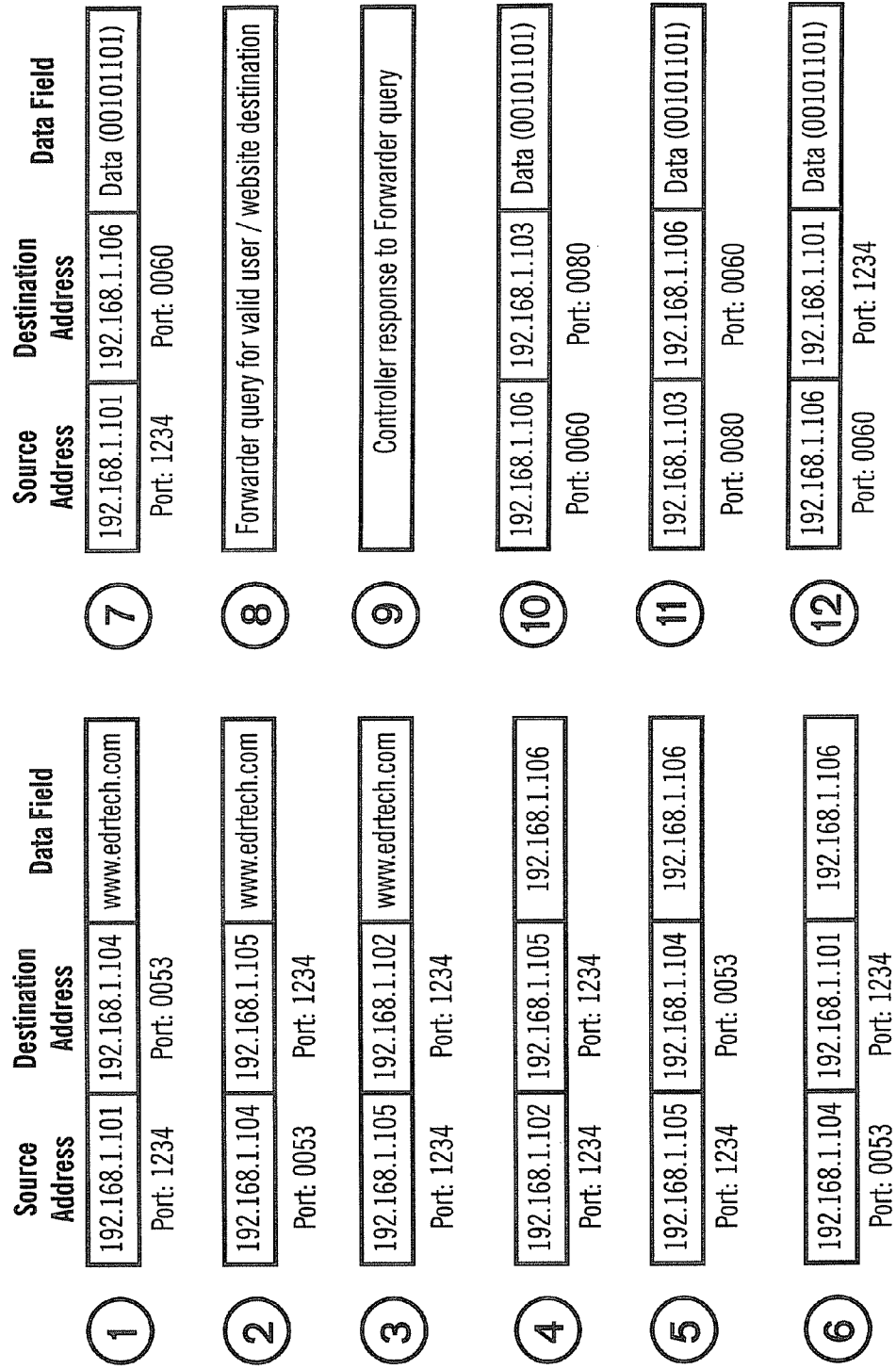
FIG. 2 illustrates the packet contents as they are routed through the network.

Under the current invention, when an unresolved packet is sent from client (101), the packet is processed through the deceiver (104). A more detailed representation of the packet, as well as exemplary port connections, is shown in FIG. 2. It should be pointed out that the term "packet" may mean an IP packet, an UDP datagram, or other transmitted data. When the packet (1) is transmitted, the packet will be transparently addressed to the deceiver (104). Upon receipt of the packet, the deceiver (104) will recognize the source of the packet (1) through the IP source address, shown in FIG. 2. The fields in which the IP source and destination addresses function are described in greater detail in RFC 791 ("DARPA Internet Program Protocol Specification"). By parsing the data field through the controller (106), the deceiver will determine the intended domain name that the client (101) wants to reach.

From this point, the deceiver (104) queries the controller (106) to initiate a name resolution. The controller (106) then sends the packet (2) where the IP destination address of the DNS (105) is now placed in the packet (2), and is transmitted onward. In the meantime, the controller (106) stores the client's (101) IP location, and determines a name-to-IP address time-to-live (TTL). The TTL is the time period in which the client (101) may assume a valid name-to-IP address. The TTL of the name-to IP address may be established through the use of cache, or any other suitable memory available. Typically, the TTL field is a 32 bit integer that represents units of seconds, and is primarily used by resolvers when they cache network resource records. The TTL describes how long a resource record can be cached before it should be discarded. The TTL may be assigned by the administrator for the zone where the data originates. Under the present invention, once the TTL expires, the client must perform another query in order to establish a connection with an IP address.

Upon receipt of the packet (2), the controller (106) determines the source of the packet, and subsequently proceeds to process the domain name resolution request, and queries the DNS name server (105) in packet (3) to obtain the website server (108) IP address. When the destination website IP address is resolved in the DNS (105), it is transmitted back to the controller (106) in packet (4). When the controller (106) obtains the IP address of the destination website server (108), the controller (106) then proceeds to establish connection with a forwarder (107) through which to communicate through. Once connected, the controller (106) then records the IP address of the forwarder (107). The forwarder's (107) address is then used by the controller (106) to create a valid session for the client (101), by correlating the forwarder address with the TTL of the client (101) and the destination website server (108). As long as the client's name-to-IP-address has not expired (i.e., the TTL has not run out), the controller (107) will associate the established forwarder (107) with the session. After connecting with a forwarder (107), the controller (106) then proceeds to store the client (101) IP address, the destination website (108) IP address, the IP address of the forwarder (107), and the determined TTL. The stored elements (200) are disclosed in FIG. 1.

After storing the pertinent information, the controller (106) then returns the forwarder (107) IP address back to the deceiver (104) via packet (5). The contents of packet (5) are shown in FIG. 2. After the packet (5) is routed through the deceiver (104), the packet (6) is then transmitted to the client (101), along with the TTL. Upon receipt of the packet (6), the client will be "deceived" into thinking that the forwarder (107) IP address is actually the destination website server (108). At this point, any communication between the client (101) and the website server (108) will be taking place in a virtual domain, since both the client (101) and the website server (108) do not technically exist to each other—the client is isolated from the destination sites of his or her data packets, and the destination sites are isolated from the clients that are accessing the site.

One advantage of this configuration is that the virtual namespaces allow system administrators and clients to create a virtually endless string of identities for clients and their target website server(s). For example, a virtual namespace may be set up as ".bank", thus identifying a bank classification. If a client wishes to visit a server that is known to be related to banks, the client could type "wellsfargo.bank" and be routed to "wellsfargo.com" via the system described in FIG. 1. Alternately, a client could enter "*.bank" and receive an HTML page with all registered entries. Furthermore, the client could customize the identification used on the Internet (e.g., "wellsfargo.doug"). Names could be created ad hoc or could be associated with groupware (e.g., "mother.birthday.card"; "smith.family.reunion.newyork"). The variations are virtually endless.

Some of the implementations of the virtual namespaces and underlying domains include, but are not limited to:

(1) creating unique environments for marketing, branding, advertising and promotion purposes;

(2) allowing for personalized Web identities for individuals, corporations, organizations, etc.;

(3) providing anonymous browsing, searching and e-mailing;

(4) creating environments for users to establish groups for collaborative communication or application purposes;

(5) cataloguing domain names under intuitive categories or functions (e.g. "bestbuy.shop", "amazon.shop", etc.);

(6) creating a search index which allows the user(s) to locate all members of a specific category and identifying distinct products, goods, services, content, or information provided by any member of any category and/or identification;

(7) creating directories that contain telephone, Internet, fax, wireless, page, cellular, email, instant messaging and/or similar data under one or more human readable formats addressable by a communication device.

When the client makes a transmission to the website server (108), the packet (7) is now routed to the forwarder (107). The client (101) will typically connect to the forwarder (107) through a well-known port. After receiving the packet from the client (101), the forwarder (107) proceeds to query the controller (106) (shown as packet (8)) to determine: (1) whether the client (101) is valid; (2) if the TTL has not expired; and (3) if the IP address of the web site server (108) that the client wishes to connect to is valid. If everything is confirmed, the controller (106) then sends back the relevant information via packet (9). The forwarder (107) then extracts the needed information including the website server (108) IP address, and forwards the packet on to its intended destination.

It should be understood that the deceiver (104), the controller (106), and the forwarder (107) are applications. The website server (108) may be generalized as any server application. Furthermore, the deceiver (104), the controller (106), and the forwarder (107) can all be on a single computer, or separate computers. Also, the deceiver (104) and the controller (105) can be on the client's computer.

Figure 3:
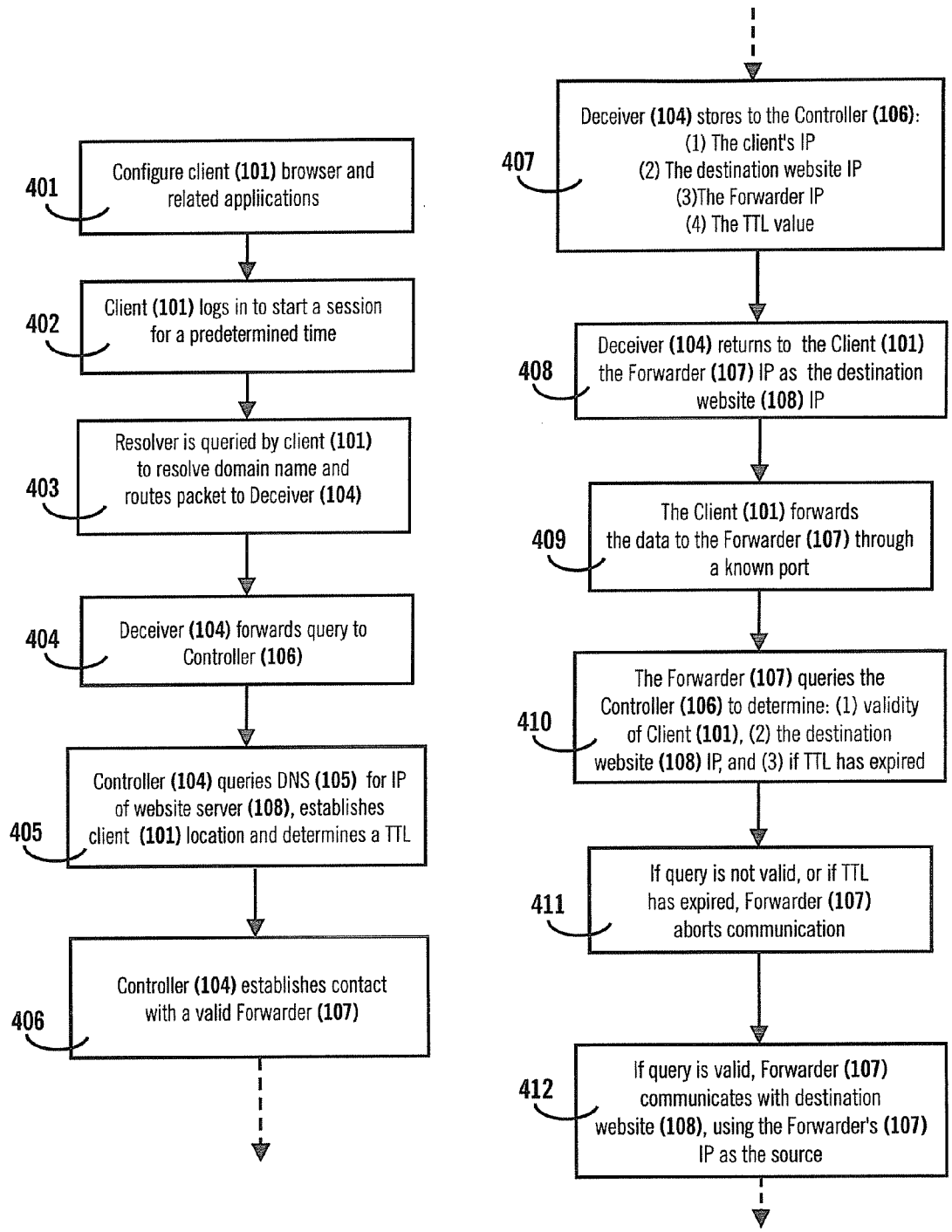
FIG. 3 generally provides a flowchart representation of a client sending a packet to be resolved, and the subsequent misdirection of the client to a destination website via the present invention.
Figure 4:
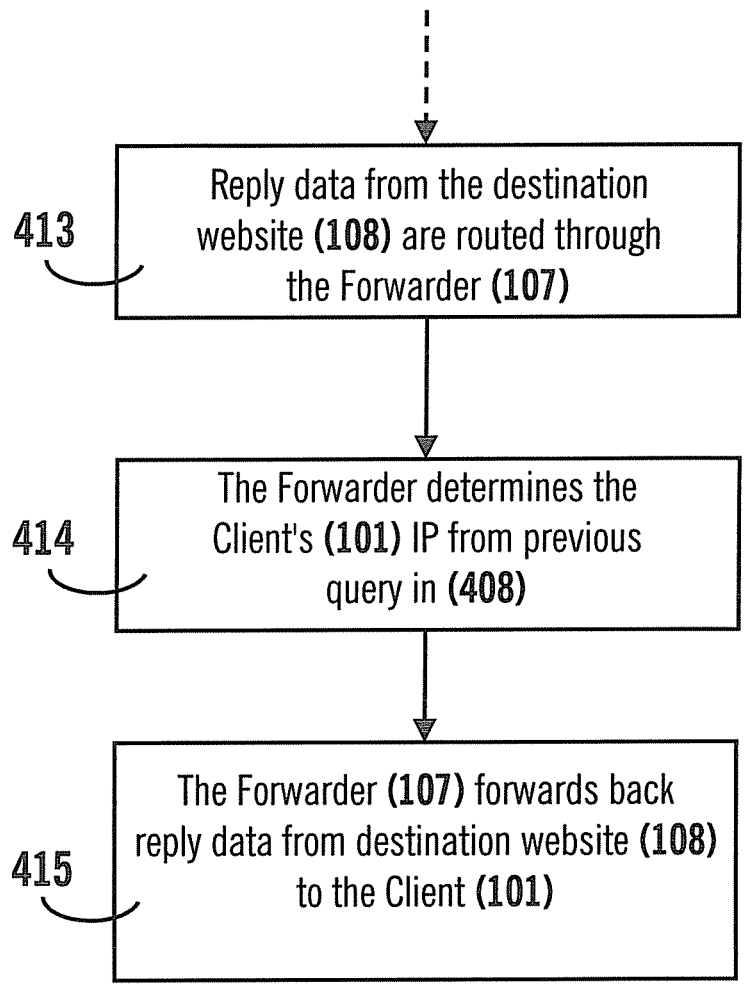
FIG. 4 generally provides a flowchart representation when the website server responds back to the client through the invention.

FIG. 3-4 represent a flowchart representation of the invention as previously disclosed in FIG. 1-2. In step (401), the client configures software/hardware on the client computer, and establishes a session by signing on or logging into a network for a predetermined time (402). When the client wishes to transmit data onto the network, or otherwise communicate with other computers or servers, one option available for the client is to query the resolver in order to retrieve an intended destination site (403). In (403), the resolver query is routed to the deceiver. After receiving the contents of the resolver, the deceiver then forwards the query to the controller in (404).

When the controller receives the query packet, the controller next records the location of the client, determines the TTL for the client session, and further queries a DNS name server, and receives back the IP address of the website which the client wishes to contact (405). In (406), the controller then establishes contact with an available forwarder through which the client session may be transmitted through, and subsequently records the IP address. While it is not displayed in the flowchart, if the controller determines that: (1) a TTL has expired; (2) an invalid client is sending the query; (3) a valid forwarder is unavailable; or (4) a desired website destination is invalid, or any combination thereof, the controller aborts the remainder of the process and transmits the appropriate message or subroutine to the client. If everything is determined to be valid, then the controller proceeds to store into memory the client's IP address, the destination website IP address, the forwarder IP address, and the TTL (407).

In step (408), the controller sends back to the deceiver the forwarder IP address, that is masquerading as the destination website IP address. The deceiver in turn sends the data back to the client (409), where the client then connects with the forwarder through a known port. The forwarder next queries the controller to determine the validity of the client, the status of the TTL, and the IP address of the website which the client is trying to reach (410). Just like the controller, if the forwarder determines at this point that: (1) a TTL has expired; (2) an invalid client is sending the query; or (3) a desired website destination is invalid, or any combination thereof, the forwarder aborts the remainder of the process, and transmits the appropriate message or subroutine back to the client (411). If everything is determined to be valid, the forwarder will proceed to transmit the client's data to the destination website server (412).

Once the destination web site receives the data from the client, the server will only recognize the forwarder as the source, and thus would only communicate back to the client via the forwarder. Accordingly, if the website server requires to communicate back to the client, the data is routed through the forwarder (413). When data is received by the forwarder, the forwarder, in principle, reverses the process disclosed in (410) to determine the source client which is intended to receive the website server's data (414). The data may be of any kind including, but not limited to, text, programs, applets, video, audio, etc. Once the forwarder determines the client's proper IP address, the forwarder then transmits the reply data back to the client (415).

Although the present invention has been described in detail, it is to be understood that various changes, alterations, and substitutions can be made without departing from the spirit and scope of the invention. More particularly, it should be apparent to those skilled in the pertinent art that the above described invention is algorithmic and is executable by a suitable conventional computer system or network. Alternate embodiments of the present invention may also be suitably implemented, at least in part, in firmware or hardware, or some suitable combination.

What is claimed is:

1. A method, comprising:
   determining, by a controller device comprising a processor, a destination internet protocol (IP) address from a plurality of categories for virtual names based on a virtual namespace destination address specified by request data received from a device, wherein a category of the plurality of categories is related to the virtual namespace destination address;
   establishing a correlation between the destination IP address and a forwarder IP address of a forwarder device; and
   instructing the forwarder device to send the request data to the destination IP address.

2. The method of claim 1, wherein the virtual namespace destination address comprises a domain name extension.

3. The method of claim 1, wherein the plurality of categories for virtual names comprises respective human-readable words.

4. The method of claim 1, wherein the determining the destination IP address comprises sending, by the controller device, a query to a server device to initiate a name resolution for the virtual namespace destination address.

5. The method of claim 1, further comprising:
establishing a name-to-IP-address time-to-live (TTL) parameter of the device, wherein the name-to-IP-address TTL parameter defines a time duration for which the correlation is valid.

6. The method of claim 1, further comprising initiating a sending of a data packet comprising the forwarder IP address to the device.

7. The method of claim 5, further comprising:
receiving, from the forwarder device, a request to confirm at least one of a validity of the device or a status of the name-to-IP-address TTL parameter of the device; and
in response to the receiving the request, sending a response to the forwarder device confirming at least one of the validity of the device or the status of the name-to-IP-address TTL parameter of the device.

8. A system, comprising:
a processor, coupled to a memory, configured to execute or facilitate execution of computer-executable instructions to perform operations, comprising:
identifying a destination internet protocol (IP) address corresponding to a category, of a plurality of categories for virtual names, related to a virtual namespace destination address represented in a data request from a device;
establishing a correlation between a forwarder IP address of a forwarder device and the destination IP address; and
sending an instruction to the forwarder device to forward the data request to the destination IP address.

9. The system of claim 8, wherein the data request comprises a domain name extension as at least a portion of the virtual namespace destination address.

10. The system of claim 9, wherein the domain name extension is formatted as human language text.

11. The system of claim 8, wherein the operations further comprise querying a server device to facilitate resolving a name for the virtual namespace destination address.

12. The system of claim 8, wherein the operations further comprise querying a domain name server to facilitate the identifying the destination IP address.

13. The system of claim 8, wherein the operations further comprise establishing a name-to-IP-address time-to-live (TTL) value that defines a time period of validity for the correlation.

14. The system of claim 13, wherein the operations further comprise initiating a sending, to the forwarder device of confirmation information confirming at least one of a validity of the device or a status of the name-to-IP-address TTL value of the device.

15. The system of claim 8, wherein the operations further comprise sending a data packet comprising the forwarder IP address to the device.

16. A non-transitory computer-readable storage device comprising computer-executable instructions that, in response to execution, cause a system to perform operations, comprising:
in response to the receiving, from a device, a data request comprising a virtual namespace destination address, selecting a destination internet protocol (IP) address from a plurality of categories for virtual names, wherein a category of the plurality of categories corresponds to the virtual namespace destination address;
establishing a correlation between the destination IP address and a forwarder IP address of a forwarder device; and
instructing the forwarder device to direct the data request to the destination IP address.

17. The non-transitory computer-readable storage device of claim 16, wherein the operations further comprise establishing a variable of the device that defines a time period for which the correlation is to remain established.

18. The non-transitory computer-readable storage device of claim 17, wherein the operations further comprise:
receiving, from the forwarder device, a request to confirm at least one of a validity of the device or a status of the name-to-IP-address TTL variable of the device; and
in response to the receiving the request, sending a response to the forwarder device that indicates confirmation of at least one of the validity of the device or the status of the name-to-IP-address TTL variable of the device.

19. The non-transitory computer-readable storage device of claim 16, wherein the virtual namespace destination address comprises a domain name extension.

20. The non-transitory computer-readable storage device of claim 16, wherein the selecting the destination IP address comprises sending a query to a server device to initiate a name resolution for the virtual namespace destination address.

\* \* \* \* \*